US010953612B2

(12) United States Patent
Khuong et al.

(10) Patent No.: US 10,953,612 B2
(45) Date of Patent: Mar. 23, 2021

(54) METHOD AND SYSTEM FOR FORMING HOLES WITHIN AN UNCURED COMPOSITE SHEET, AND METHOD FOR FORMING A COMPOSITE STRUCTURE

(71) Applicant: The Boeing Company, Chicago, IL (US)

(72) Inventors: Kenny T. Khuong, Summerville, SC (US); Michael J. Basala, Summerville, SC (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 16/115,798

(22) Filed: Aug. 29, 2018

(65) Prior Publication Data

US 2020/0070446 A1    Mar. 5, 2020

(51) Int. Cl.
*B29C 70/54*    (2006.01)
*B29L 31/30*    (2006.01)

(52) U.S. Cl.
CPC ..... *B29C 70/545* (2013.01); *B29L 2031/3076* (2013.01)

(58) Field of Classification Search
CPC .................................................. B29C 70/545
See application file for complete search history.

(56) References Cited

U.S. PATENT DOCUMENTS

| 5,252,279 A * | 10/1993 | Gore | B29C 70/545 264/154 |
| 5,320,909 A * | 6/1994 | Scharman | C23C 4/02 415/174.4 |
| 6,179,943 B1 * | 1/2001 | Welch | B29C 70/08 156/160 |
| 7,347,961 B2 * | 3/2008 | Obrachta | B29C 70/44 264/156 |
| 2010/0163167 A1 * | 7/2010 | Maheshwari | B29C 43/10 156/245 |

FOREIGN PATENT DOCUMENTS

| EP | 2384275 B1 | 3/2013 |
| GB | 1 352 198 | 5/1974 |
| GB | 2 025 302 | 1/1980 |
| GB | 2 256 611 | 12/1992 |

OTHER PUBLICATIONS

European Patent Office, Extended European Search Report, App. No. 19193654.1 (dated Jan. 30, 2020).

* cited by examiner

*Primary Examiner* — Galen H Hauth
(74) *Attorney, Agent, or Firm* — Walters & Wasylyna LLC

(57) ABSTRACT

A method for forming holes within an uncured composite sheet includes perforating the uncured composite sheet with a plurality of pins of a metallic pin mat and heating the plurality of pins to heat portions of the uncured composite sheet surrounding each pin.

23 Claims, 11 Drawing Sheets

METHOD AND SYSTEM FOR FORMING HOLES WITHIN AN UNCURED COMPOSITE SHEET, AND METHOD FOR FORMING A COMPOSITE STRUCTURE

FIELD

The present application relates to the field of methods and systems for forming perforations in composite structures.

BACKGROUND

Processes for perforating composite sheets for acoustic panels include abrasive perforation (e.g., impingement of hard particles), mechanical drilling, and plastic pin mats. Abrasive perforation can have a significant cycle time, have complex tooling, and/or require considerable amount of cleanup. Mechanical drilling can have a significant cycle time, have a recurring cost of drill bit replacements, and/or result in cutting of fibers. Drilling cycle time can be extensive for large acoustic panels with millions of perforations.

Plastic pin mats are non-reusable and are thus formed to contour and trimmed to size for one-time usage. Also, to maintain the shape of the perforated holes, the plastic pin mat and perforated composite sheet are typically vacuum bagged and subjected to autoclave to partially cure the perforated composite sheet prior to separating from the plastic pin mat. The plastic pin mats are typically difficult to separate from the perforated composite sheet. In addition, the plastic pins sometimes break off in the hole and are required to be removed or drilled out in a subsequent process. After separation, volcano formations on the perforated composite sheet are sanded and subsequently cleaned up.

Accordingly, those skilled in the art continue with research and development in the field of methods and systems for forming perforated composite structures.

SUMMARY

In one embodiment, there is a method for forming holes within an uncured composite sheet. The method includes perforating the uncured composite sheet with a plurality of pins of a metallic pin mat and heating the plurality of pins to heat portions of the uncured composite sheet surrounding each pin.

In an aspect, the step of perforating the uncured composite sheet includes positioning the uncured composite sheet between the metallic pin mat and a pressure backer and applying a compressive force between the metallic pin mat and the pressure backer to perforate the uncured composite sheet with the plurality of pins of the metallic pin mat.

In another aspect, the step of applying the compressive force includes applying the compressive force between the metallic pin mat and the pressure backer until the plurality of pins perforate through an entire thickness of the uncured composite sheet.

In another aspect, the step of applying the compressive force includes applying the compressive force between the metallic pin mat and the pressure backer until the plurality of pins perforate through an entire thickness of the uncured composite sheet and the plurality of pins perforate into the pressure backer.

In another aspect, the step of heating the plurality of pins includes resistively heating the plurality of pins by an electrical energy source.

In another aspect, the step of heating the plurality of pins includes heating the plurality of pins prior to the perforation of the uncured composite sheet, during the perforation of the uncured composite sheet, or both prior to and during the perforation of the uncured composite sheet to reduce a viscosity of a resin of the uncured composite sheet.

In another aspect, the step of perforating the uncured composite sheet includes gradually displacing fibers in a fiber-reinforced prepreg ply of the uncured composite sheet while perforating the uncured composite sheet.

In another aspect, the step of perforating the uncured composite sheet further includes stopping the displacing of the fibers while continuing the perforating of the uncured composite sheet.

In another aspect, the step of heating the plurality of pins includes partially curing perimeter portions of the uncured composite sheet surrounding each pin.

In another aspect, the step of partially curing perimeter portions of the uncured composite sheet includes curing perimeter portions sufficiently to maintain a shape of the holes after separation of the uncured composite sheet and the metallic pin mat.

In another aspect, remaining portions of the uncured composite sheet between the perimeter portions of the uncured composite sheet remain sufficiently uncured to maintain overall flexibility of the uncured composite sheet after separation of the uncured composite sheet and the metallic pin mat.

In another aspect, the method for forming holes within an uncured composite sheet further includes isolating a heat of the metallic pin mat from remaining portions of the uncured composite sheet that remain sufficiently uncured to maintain overall flexibility of the uncured composite sheet.

In another aspect, the method for forming holes within an uncured composite sheet further includes curing remaining portions of the uncured composite sheet between the perimeter portions of the uncured composite sheet sufficiently to fix an overall shape of a resulting composite sheet.

In another embodiment, there is a system for forming holes within an uncured composite sheet. The system includes a metallic pin mat, a pressure applicator, and an electrical energy source. The metallic pin mat includes a plurality of pins for perforating the uncured composite sheet. The pressure applicator is for pressing the uncured composite sheet against the metallic pin mat. The electrical energy source is coupled to the metallic pin mat for resistively heating the plurality of pins.

In an aspect, an overall shape of the metallic pin mat is contoured.

In another aspect, the plurality of pins are tapered from a base portion to a narrower end portion.

In another aspect, the base portion includes a constant diameter portion.

In another aspect, the pressure applicator includes a pressure roller configured to pressing the uncured composite sheet against the metallic pin mat.

In another aspect, the system for forming holes within an uncured composite sheet further includes a pressure backer positioned between the metallic pin mat and the pressure applicator, the pressure backer configured to support a surface of the uncured composite sheet opposite to the metallic pin mat.

In another aspect, the pressure backer is formed from at least one of rubber and dense foam.

In another aspect, the system for forming holes within an uncured composite sheet further includes a thermal isolator on the metallic pin mat between adjacent pins, the thermal isolator configured to isolate a heat of the metallic pin mat from portions of the uncured composite sheet.

In yet another embodiment, there is a method for forming a composite structure including a core material and a perforated composite sheet. The method includes perforating an uncured composite sheet with a plurality of pins of a metallic pin mat to yield an uncured perforated composite sheet, partially curing at least perimeter portions of the uncured perforated composite sheet surrounding each pin to yield a partially cured perforated composite sheet, separating the partially cured perforated composite sheet and the metallic pin mat, and bonding the partially cured perforated composite sheet with the core material.

In an aspect, the step of bonding the partially cured perforated composite sheet with the core material includes co-curing the partially cured perforated composite sheet and the core material.

Other embodiments of the disclosed methods and systems for forming perforated composite structures will become apparent from the following detailed description, the accompanying drawings and the appended claims.

DETAILED DESCRIPTION

Figure 1:
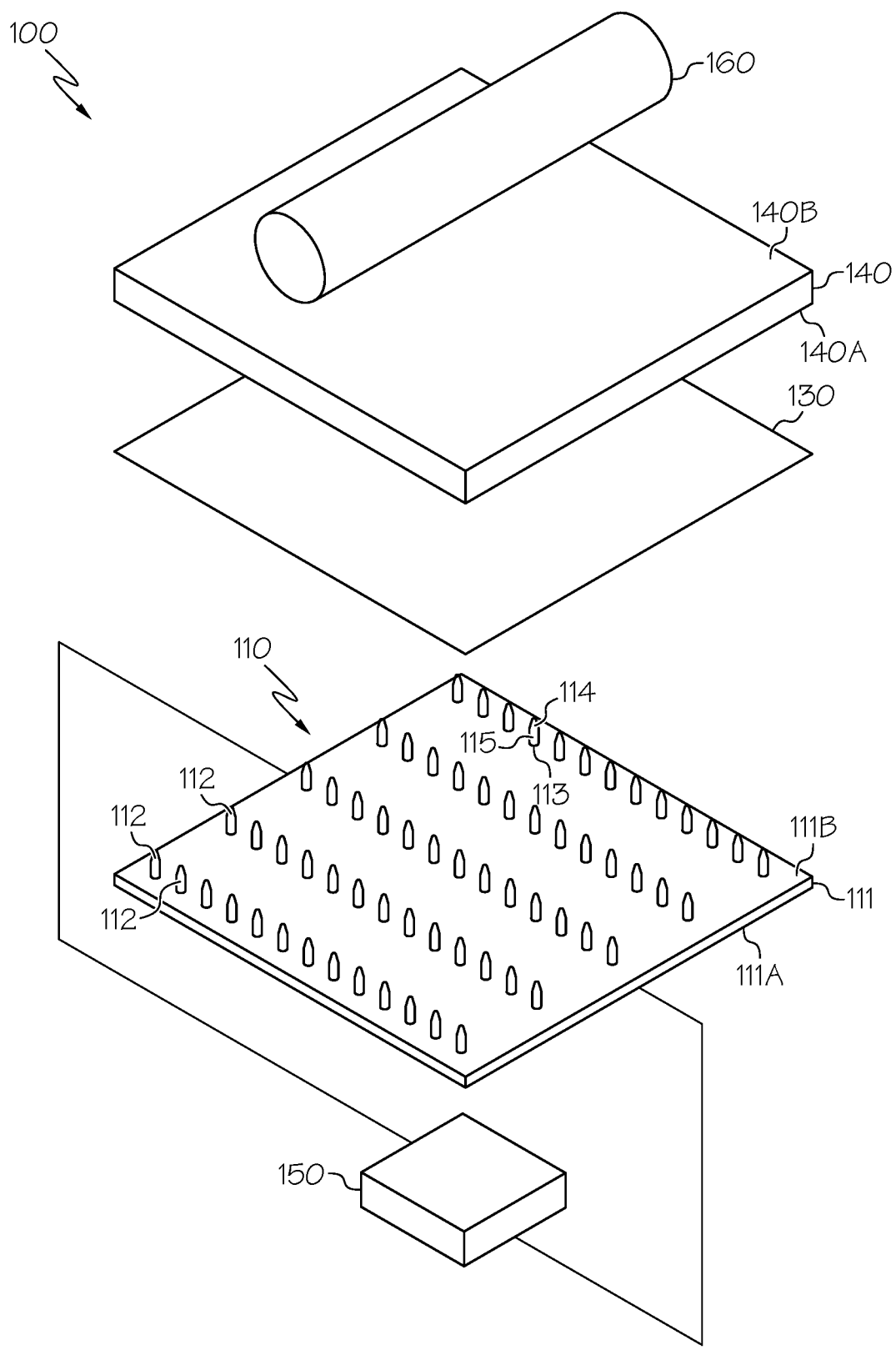
FIG. 1 is a perspective schematic view of an exemplary system for practicing a method for forming holes within an uncured composite sheet.
Figure 2:
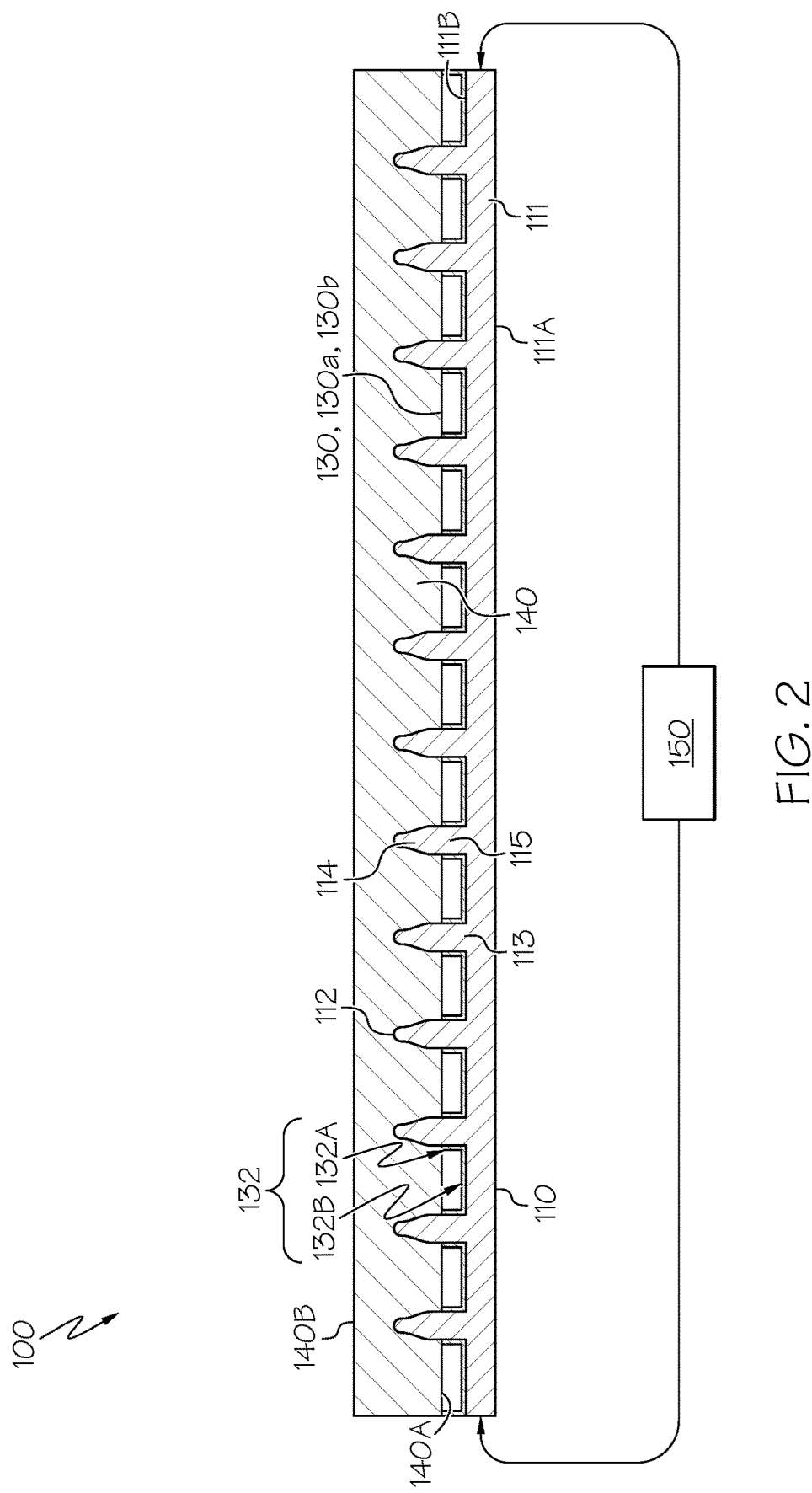
FIG. 2 is a sectional schematic view of the system of FIG. 1 after perforation of the uncured composite sheet.

FIG. 1 is a perspective schematic view of an exemplary system 100 for practicing a method for forming holes within an uncured composite sheet. FIG. 2 is a sectional schematic view of the system 100 of FIG. 1 after perforation of the uncured composite sheet.

As shown in FIGS. 1 and 2, the system 100 includes a metallic pin mat 110, a pressure applicator 160, and an electrical energy source 150. The system 100 can be used with a composite sheet, such as an uncured composite sheet 130. The system 100 can further include a pressure backer 140 configured to support a surface of the uncured composite sheet 130 opposite to the metallic pin mat 110.

The metallic pin mat 110 includes a base 111 and a plurality of pins 112. The base 111 has a first major side 111A and a second major side 112A. The first major side 111A is typically flat but other configurations of the first major side 111A are possible. The plurality of pins 112 extend out from the second major side 111A of the metallic pin mat 110. The plurality of pins 112 of the metallic pin mat 110 preferably extend generally orthogonally out from the second major side 111B of the metallic pin mat 110. By extending generally orthogonally out from the second major side 111B, reliable perforation of the uncured composite sheet can be facilitated and subsequent removal from the plurality of pins 112 can be facilitated. As shown, the plurality of pins 112 preferably have a circular cross-section, but the cross-sectional shape of the plurality of pins 112 may vary. The plurality of pins 112 can be arranged in various configurations to correspond with desired locations of perforations to be formed in the uncured composite sheet 130.

The metallic pin mat 110 may be formed from any metallic material, such as a metal or an alloy. For example, the metallic pin mat 110 may be formed from at least one of an iron-based metal or alloy, an aluminum-based metal or alloy, or a copper based metal or alloy, or a titanium-based metal or alloy. Preferably, the metallic pin mat 110 is formed from a high resistance metallic material. By forming the metallic pin mat 110 from a metallic material, the metallic pin mat 110 can provide for conductivity and resistivity useful for resistive heating, strength and stiffness useful for perforating the uncured composite sheet 130, and sufficient durability for reusing the metallic pin mat 110 during subsequent perforating of additional uncured composite sheets 130.

The plurality of pins 112 are preferably tapered from a base portion 113 to a narrower end portion 114, where the base portion 113 preferably includes a constant diameter portion 115. In an aspect, the tapering of the plurality of pins 112 of the metallic pin mat 110 from the base portion 113 to the narrower end portion 114 facilitates a gradual displacement of fibers in a fiber-reinforced prepreg ply of the uncured composite sheet 130 during a penetration of the fiber-reinforced prepreg ply by the plurality of pins 112. The constant diameter portion 115 of the base portion 113 of the plurality of pins 112 facilitates a reliable and/or constant diameter of the resulting perforations to be formed in the uncured composite sheet 130.

In an aspect, the pressure applicator 160 is configured to press the uncured composite sheet 130 against the metallic pin mat 110. The pressure applicator 160 includes any structure that can perform the function of pressing the uncured composite sheet 130 against the metallic pin mat 110. In an example, the pressure applicator 160 includes a pressure roller for pressing the uncured composite sheet 130 against the metallic pin mat 110.

In an aspect, the electrical energy source 150 is coupled to, or is configured to be coupled to, the metallic pin mat 110. The electrical energy source 150 includes any source of electrical energy for resistively heating the metallic pin mat 110. The electrical energy source 150 is coupled to the metallic pin mat 110 in any suitable manner, such as by way of positive and negative terminals connecting the electrical energy source 150 to the metallic pin mat 110.

As previously mentioned, the system 100 can further include a pressure backer 140 positioned between the metallic pin mat 110 and the pressure applicator 160. As shown, the pressure backer 140 has a first major side 140A facing the metallic pin mat 110, a second major side 140B facing the pressure applicator 160, and thickness of material 140C between the first major side 140A and second major side 140B. Preferably, the first major side 140A and second major side 140C are substantially flat.

In an aspect, the first major side 140A and second major side 140B of the pressure backer 140 have a length and width generally corresponding a length and width of the metallic pin mat 110. In another aspect, multiple pressure backers may be positioned between the metallic pin mat 110 and the pressure applicator 160, wherein a combined length and width of the pressure backers 140 generally correspond to the length and width of the metallic pin mat 110.

In an aspect, the material 140C of the pressure backer 140 is a material that is soft enough for the plurality of pins 112 to penetrate the pressure backer 140 but hard enough to prevent volcano formation as the plurality of pins 112 penetrate the uncured composite sheet 130. For example, the pressure backer 140 may be formed from at least one of rubber and dense foam. The thickness of the material 140C may vary but is preferably thickness enough to permit partial penetration of the material 140C by the plurality of pins 112.

Figure 3:
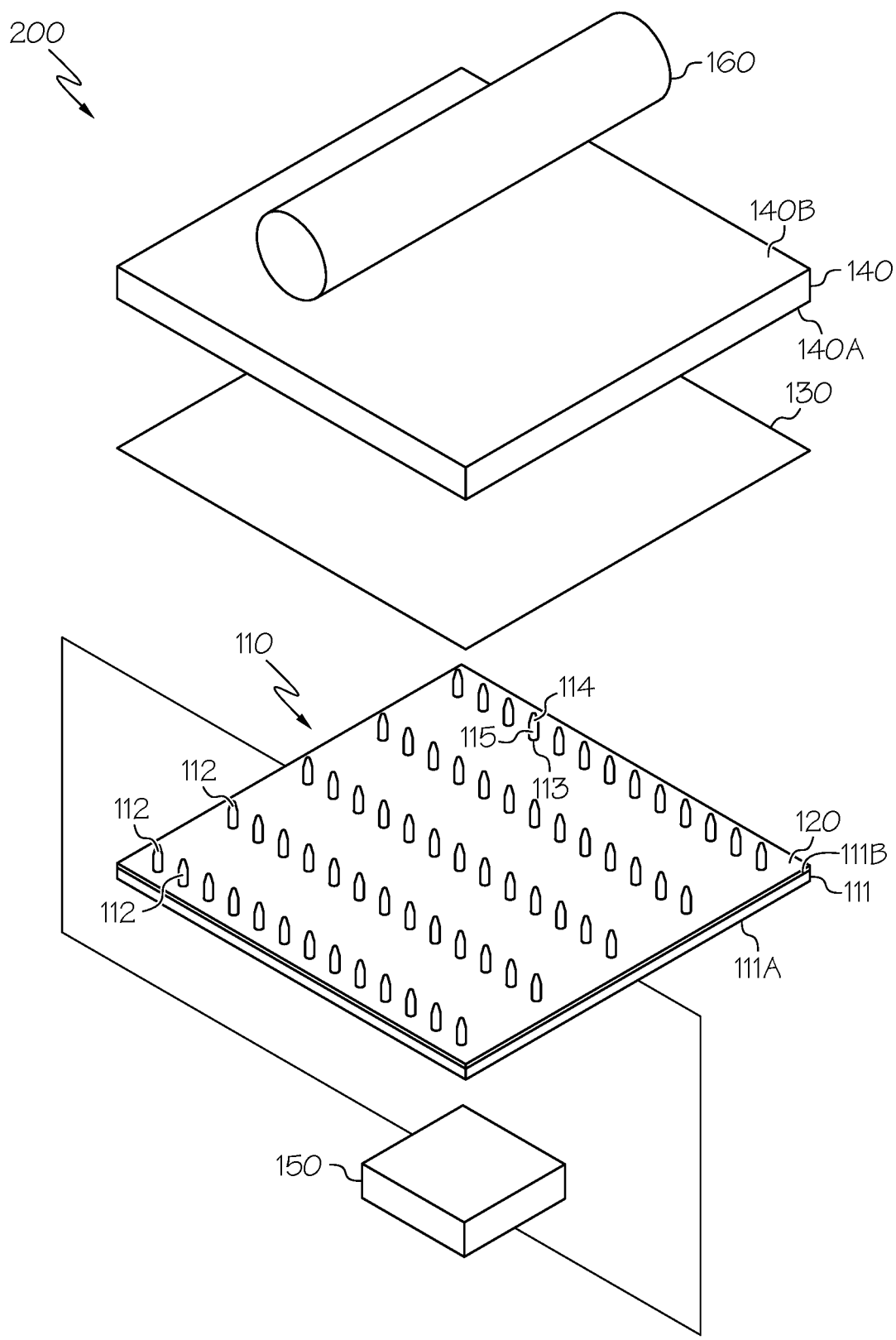
FIG. 3 is a perspective schematic view of another exemplary system for practicing a method for forming holes within an uncured composite sheet.
Figure 4:
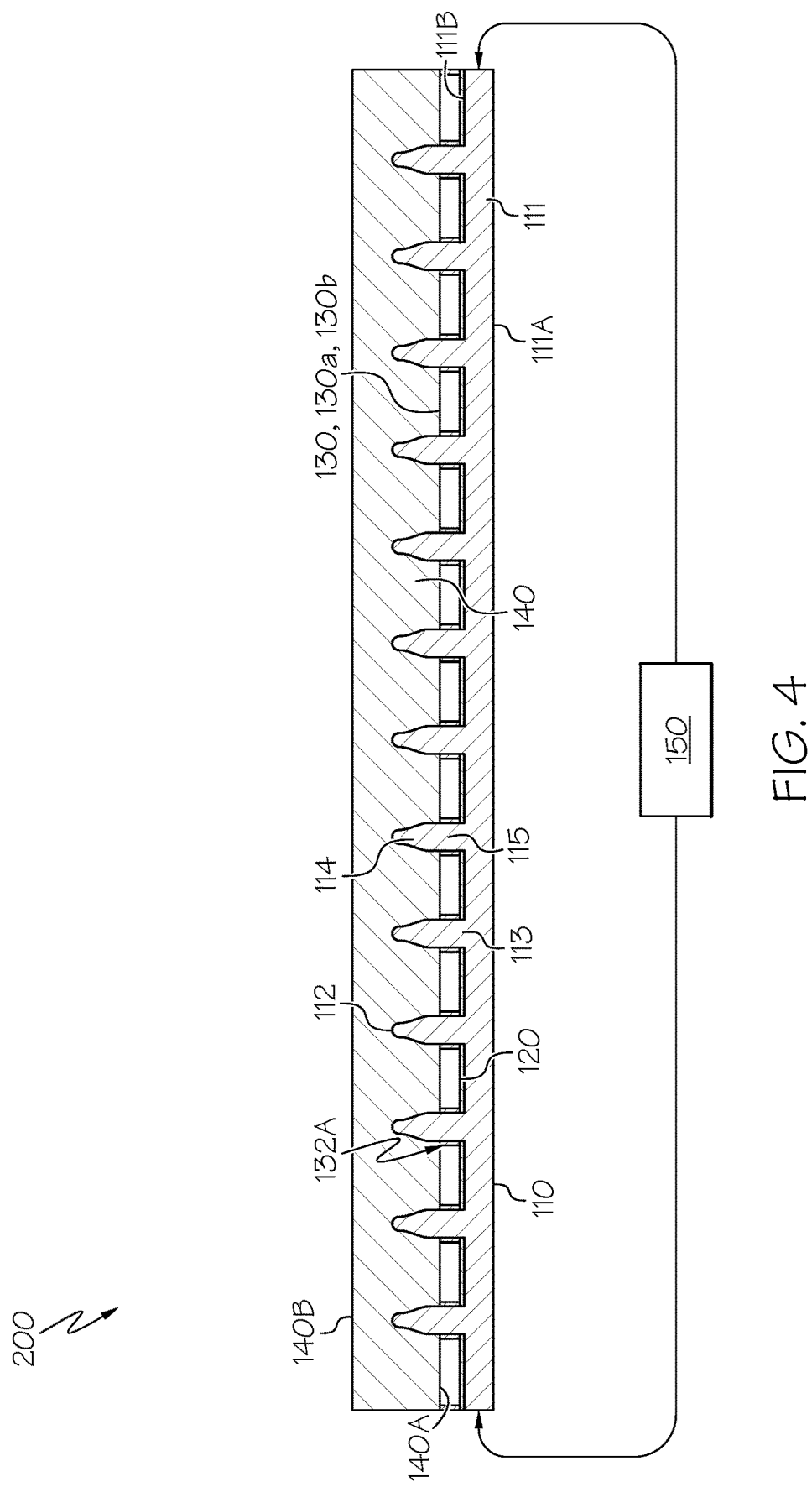
FIG. 4 is a sectional schematic view of the system of FIG. 3 after perforation of the uncured composite sheet.

FIGS. 3 and 4 show another exemplary system 200 for practicing a method for forming holes within an uncured composite sheet, in which the system 200 distinguishes from system 100 of FIGS. 1 and 2 by including a thermal isolator 120 configured to isolate a heat of the metallic pin mat 110 from portions of the uncured composite sheet 130.

As shown, the thermal isolator 120 is positioned over the second major side 111A of the base 111 of the metallic pin mat 110 and positioned between adjacent pins of the plurality of pins 112. The thermal isolator 120 may include any material or structure that prevents or reduces a transfer of heat from the base 111 of the metallic pin mat 110 to selected portions of the adjacent uncured composite sheet 130. In an example, the thermal isolator 120 is a ceramic-based coating or a polyimide film on the second major side 111B of the base 111 of the metallic pin mat 110.

Figure 5:
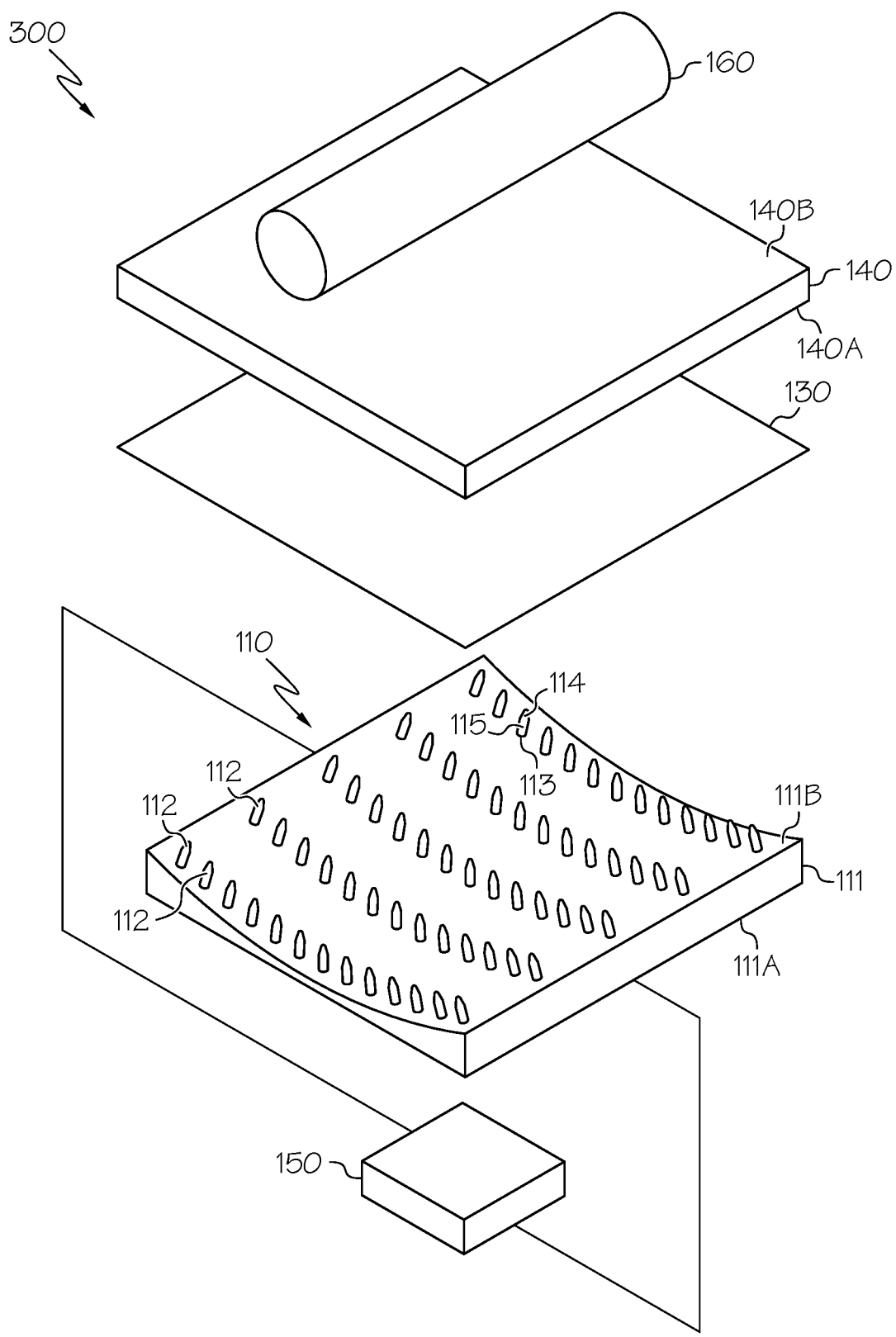
FIG. 5 is a perspective schematic view of yet another exemplary system for practicing a method for forming holes within an uncured composite sheet.
Figure 6:
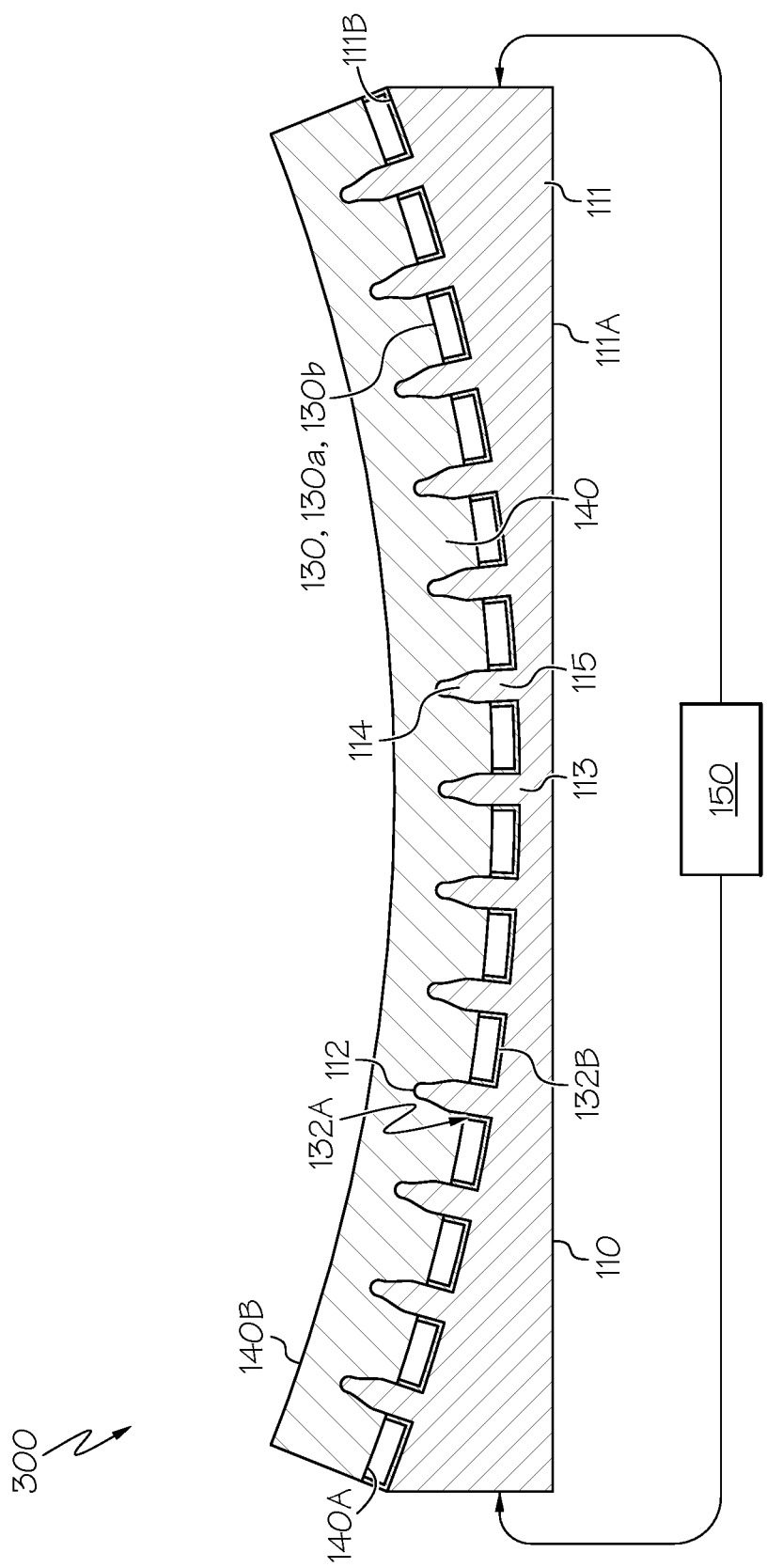
FIG. 6 is a sectional schematic view of the system of FIG. 5 after perforation of the uncured composite sheet.

FIGS. 5 and 6 show another exemplary system 300 for practicing a method for forming holes within an uncured composite sheet, in which the system 300 distinguishes from system 100 of FIGS. 1 and 2 by including a contoured metallic pin mat 110. By providing a contoured metallic pin mat 110, an uncured composite sheet 130 may be partially cured to fix an overall shape of the partially-cured composite sheet 130b to correspond to a contoured shape of the metallic pin mat 110.

Figure 7:
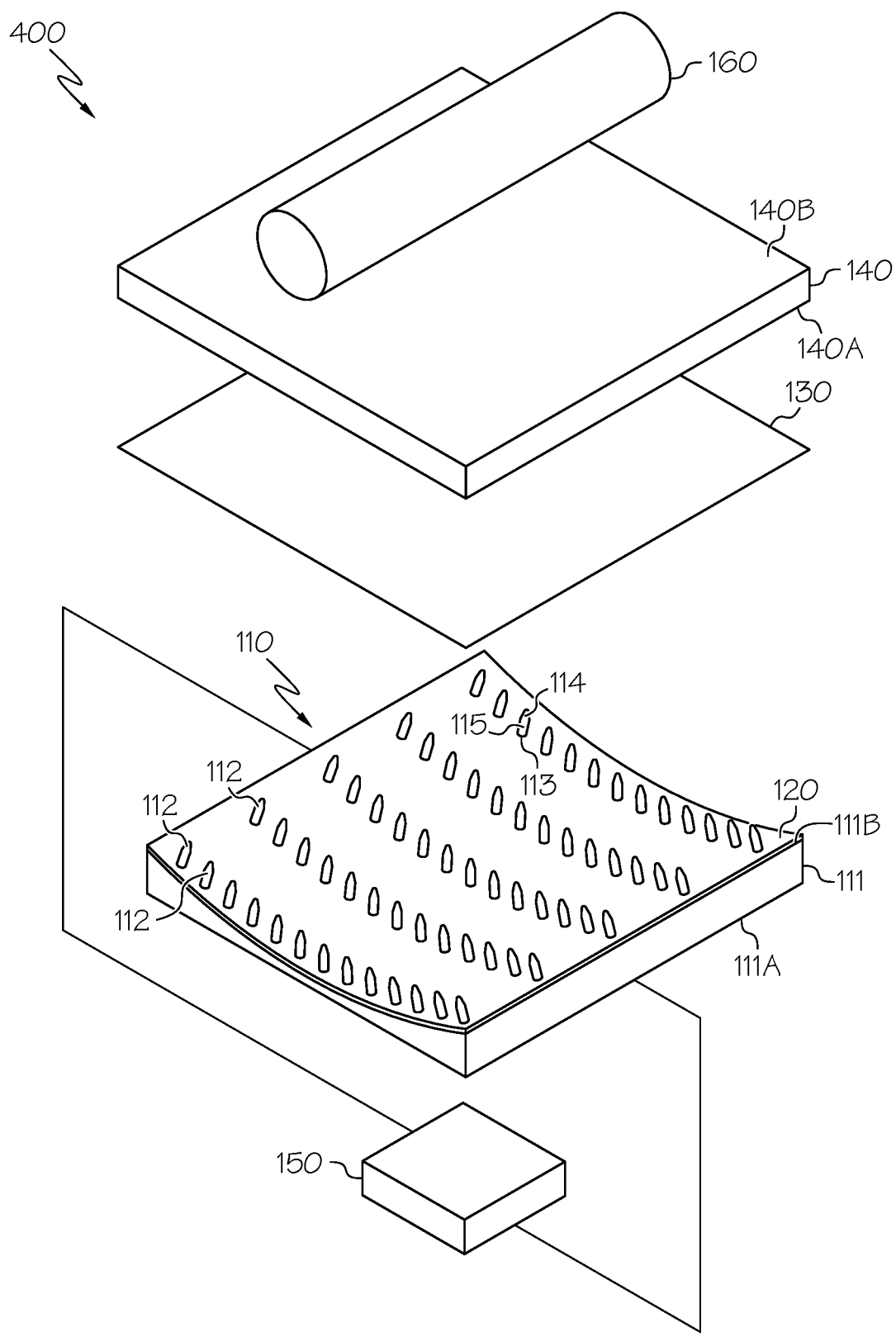
FIG. 7 is a perspective schematic view of yet another exemplary system for practicing a method for forming holes within an uncured composite sheet.
Figure 8:
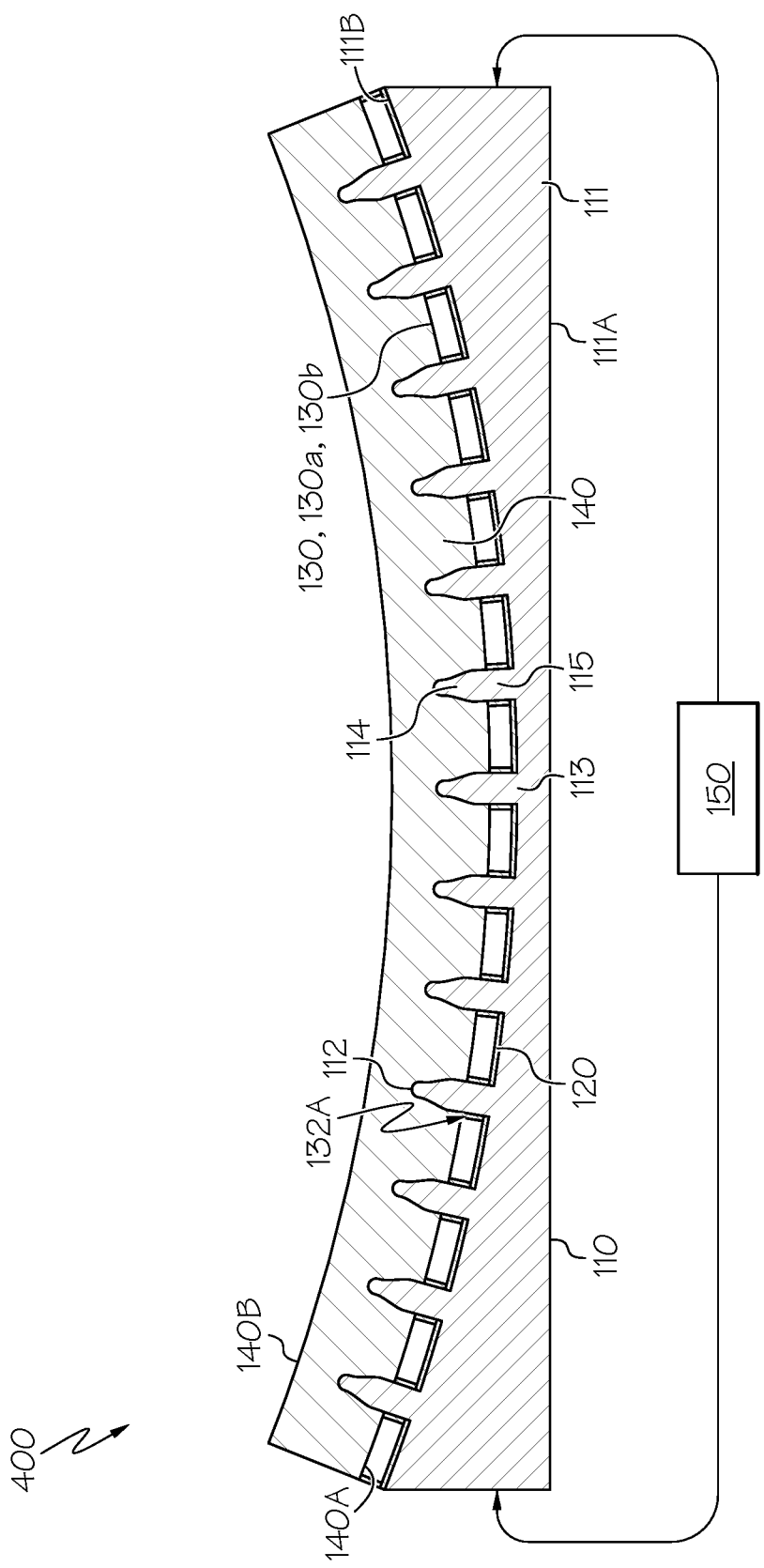
FIG. 8 is a sectional schematic view of the system of FIG. 7 after perforation of the uncured composite sheet.

FIGS. 7 and 8 show another exemplary system 300 for practicing a method for forming holes within an uncured composite sheet, in which the system 400 distinguishes from system 200 of FIGS. 3 and 4 by including a contoured metallic pin mat 110 and distinguishes from system 300 by including a contoured metallic pin mat 110. By providing the thermal isolator 120 and the contoured metallic pin mat 110, selected portions of a partially-cured composite sheet 130b may remain uncured or sufficiently uncured to maintain overall flexibility of the partially-cured composite sheet 130b after separation from the metallic pin mat 110, yet a shape of the holes may be maintained when the composite sheet 130 is re-bent to a desired contoured shaped during subsequent processes.

Figure 9:
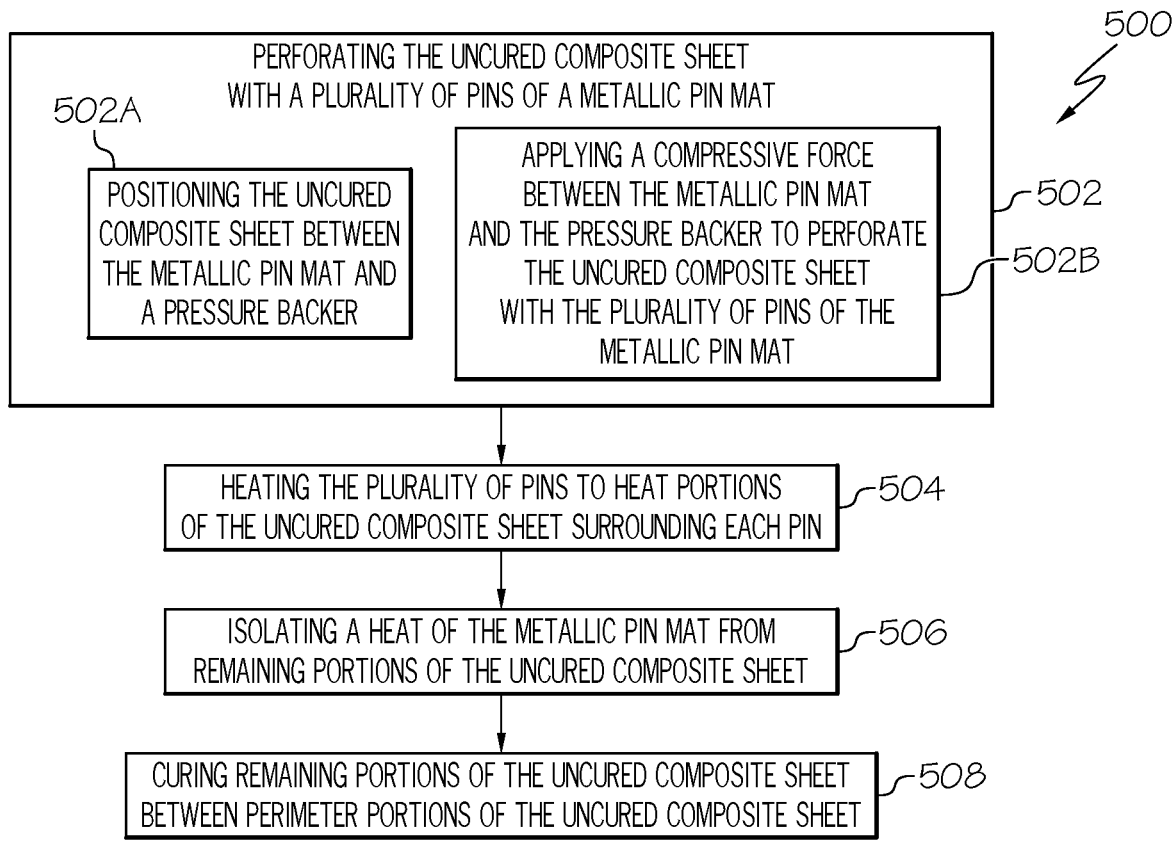
FIG. 9 is a flow diagram illustrating an exemplary method for forming holes within the uncured composite sheet.

FIG. 9 is a flow diagram illustrating an exemplary method 500 for forming holes within an uncured composite sheet. The method 500 includes, at block 502, perforating the uncured composite sheet 130 with a plurality of pins 112 of a metallic pin mat 110, and, at block 504, heating the plurality of pins 112 to heat portions of the uncured composite sheet 130 surrounding each pin. As shown in FIG. 9, the method 500 may further include, at block 506, isolating a heat of the metallic pin mat from remaining portions of the uncured composite sheet 130, or the method 500 may further include, at block 508, curing remaining portions of the uncured composite sheet 130 between perimeter portions of the uncured composite sheet 130 to produce the partially-cured composite sheet 130b.

In an aspect, the step of perforating 502 the uncured composite sheet 130 includes a step of positioning 502A the uncured composite sheet 130 between the metallic pin mat 110 and a pressure backer 140 and a step of applying 502B a compressive force between the metallic pin mat 110 and the pressure backer 140 to perforate the uncured composite sheet 130 with the plurality of pins 112 of the metallic pin mat 110 to produce a perforated uncured composite sheet 130a.

In an aspect, the step of applying 502B the compressive force comprises applying the compressive force between the metallic pin mat 110 and the pressure backer 140 until the plurality of pins 112 perforate through an entire thickness of the uncured composite sheet 130. By perforating the entire thickness of the uncured composite sheet 130 with the plurality of pins 112, holes can be formed through the uncured composite sheet 130.

In an aspect, the step of applying 502B the compressive force comprises applying the compressive force between the metallic pin mat 110 and the pressure backer 140 until the plurality of pins 112 perforate through an entire thickness of the uncured composite sheet 130 and the plurality of pins 112 perforate into the pressure backer 140. By perforating into the pressure backer 140, the pressure backer 140 can support the surface of the uncured composite sheet 130 opposite to the metallic pin mat 110.

In an aspect, the step of heating 504 the plurality of pins 112 comprises resistively heating the plurality of pins 112 by an electrical energy source 150. By resistively heating the plurality of pins 112 by the electrical energy source 150, the plurality of pins 112 can be uniformly heated in an efficient manner.

In an aspect, the step of heating 504 the plurality of pins 112 comprises heating the plurality of pins 112 prior to the perforation of the uncured composite sheet 130, during the perforation 502 of the uncured composite sheet 130, or both prior to and during the perforation 502 of the uncured composite sheet 130 to reduce a viscosity of a resin of the uncured composite sheet 130. By reducing the viscosity of the resin of the uncured composite sheet 130, the plurality of pins 112 can more easily perforate into the uncured composite sheet 130.

In an aspect, the step of perforating 502 the uncured composite sheet 130 comprises gradually displacing fibers in a fiber-reinforced prepreg ply of the uncured composite sheet 130 while perforating 502 the uncured composite sheet 130. By gradually displacing fibers in the fiber-reinforced prepreg play of the uncured composite sheet 130, the integrity of the fibers can be maintained while perforating 502 the uncured composite sheet 130. The gradually displacement of the fibers in fiber-reinforced prepreg play of the uncured composite sheet 130 can achieved, for example, by the tapering of the plurality of pins 112 of the metallic pin mat 110 from the base portion 113 to the narrower end portion 114.

In an aspect, the step of perforating 502 the uncured composite sheet 130 further comprises stopping the displacing of the fibers while continuing the perforating 502 of the uncured composite sheet 130. By stopping displacement of the fibers while continuing the perforating 502 of the uncured composite sheet 130, a reliable and/or constant diameter of the resulting perforations to be formed in the uncured composite sheet 130 can be achieved. Stopping the displacing of the fibers while continuing the perforating 502 of the uncured composite sheet 130 can be achieved, for example, by the constant diameter portion 115 of the base portion 113 of the plurality of pins 112.

In an aspect, the step of heating 504 the plurality of pins 112 comprises partially curing perimeter portions of the uncured composite sheet 130 surrounding each of the plurality of pins 112. For example, partially curing perimeter portions of the uncured composite sheet 130 comprises curing perimeter portions sufficiently to maintain a shape of the holes after separation of the partially-cured composite sheet 130b and the metallic pin mat 110.

In an aspect, remaining portions of the uncured composite sheet 130 between the perimeter portions of the uncured composite sheet 130 remain sufficiently uncured to maintain overall flexibility of the uncured composite sheet 130 after separation of the partially-cured composite sheet 130b and the metallic pin mat 110.

In an aspect, the method further includes isolating a heat of the metallic pin mat 110 from the remaining portions of the uncured composite sheet 130 that remain sufficiently uncured to maintain overall flexibility of the partially-cured composite sheet 130b.

In an aspect, the method further includes curing remaining portions of the partially-cured composite sheet 130b between the perimeter portions of the partially-cured composite sheet 130b sufficiently to fix an overall shape of the cured composite sheet 130c.

These and other aspects of the method for forming holes within an uncured composite sheet are explained in further detail in reference to FIGS. 1 to 8 as follows.

FIG. 1 is a perspective schematic view of an exemplary system 100 for practicing a method for forming holes within an uncured composite sheet. FIG. 2 is a sectional schematic view of the system 100 of FIG. 1 after perforation of the uncured composite sheet.

Prior to perforation, the composite sheet is an uncured composite sheet 130. The uncured composite sheet 130 is then perforated with the plurality of pins 112 of the metallic pin mat 110, and the plurality of pins 112 are heated to heat portions of the uncured composite sheet 130 surrounding each of the plurality of pins 112. The plurality of pins 112 may be resistively heated by the electrical energy source 150, or the entire metallic pin mat 110 may be resistively heated by the electrical energy source 150. The plurality of pins 112 or both the plurality of pins 112 and the metallic pin mat 110 may be formed from the metallic material to enable the resistive heating.

As shown in FIGS. 1 and 2, the system 100 includes a metallic pin mat 110, a pressure applicator 160, and an electrical energy source 150. The system 100 can further include, for example, a pressure backer 140. The system 100 can be used with an uncured composite sheet 130. In an aspect, the uncured composite sheet 130 includes a fiber-reinforced prepreg ply, such as a graphite fiber reinforced prepreg ply. The fiber-reinforced prepreg ply includes a resin, such as a thermoplastic resin or a thermoset resin.

As shown in FIGS. 1 and 2, the uncured composite sheet 130 is perforated with the plurality of pins 112 of the metallic pin mat 110 and the plurality of pins 112 is heated to heat portions of the uncured composite sheet 130 surrounding each pin. If the heating is sufficient, the heating of the plurality of pins 112 partially cures perimeter portions 132A of the uncured composite sheet 130 surrounding each pin and also partially cures remaining portions 132B of the uncured composite sheet 130 between the perimeter portions 132a of the uncured composite sheet 130.

During a penetration of a fiber-reinforced prepreg ply of the uncured composite sheet 130 by the plurality of pins 112, the tapering of the plurality of pins 112 of the metallic pin mat 110 from the base portion 113 to the narrower end portion 114 facilitates a gradual displacement of fibers in the fiber-reinforced prepreg ply of the uncured composite sheet 130. Thus, damage to the fibers in the fiber-reinforced prepreg ply can prevented.

After gradual displacement of the fibers in the fiber-reinforced prepreg ply of the uncured composite sheet 130, the constant diameter portion 115 of the base portion 113 of the plurality of pins 112 facilitates a reliable and/or constant diameter of the resulting perforations to be formed in the uncured composite sheet 130. Thus, by way of the constant diameter portion 115 of the base portion 113 of the plurality of pins 112, the diameter of the resulting perforations to be formed is not dependent on a depth of penetration of the plurality of pins 112 into the uncured composite sheet 130.

As shown in FIGS. 1 and 2, the uncured composite sheet 130 can be pressed against the metallic pin mat 110 by a pressure applicator 160. In an example, the pressure applicator 160 includes a pressure roller configured to pressing the uncured composite sheet 130 against the metallic pin mat 110. However, the pressure applicator 160 includes any structure that can perform the function of pressing the uncured composite sheet 130 against the metallic pin mat 110.

By positioning the pressure backer 140 formed from a material that is soft enough for the plurality of pins 112 to penetrate, the plurality of pins 112 can penetrate the pressure backer 140, and the pressure backer 140 can contact and support the surface of the uncured composite sheet 130 opposite to the metallic pin mat 110, particularly around the perimeter portions 132a of the exits of the holes, thus avoiding volcano-shaped exit holes that may typically result when the rear surface is inadequately supported. Advantageously, avoiding the volcano-shaped exit holes avoids a subsequent sanding step that is typically performed to planarize exit holes.

In an aspect, perforating the uncured composite sheet 130 is performed by positioning the uncured composite sheet 130 between the metallic pin mat 110 and the pressure backer 140 and applying a compressive force between the metallic pin mat 110 and the pressure backer 140 to perforate the uncured composite sheet 130 with the plurality of pins 112 of the metallic pin mat 110. As shown, the compressive force is applied with a pressure applicator 160, such as the roller shown in FIG. 1, or vacuum, against pressure backer 140 while the metallic pin mat 110 is held stationary. However, the compressive force may be applied with any type of pressure applicator 160, and the compressive force may be applied against the metallic pin mat 110 while the pressure backer 140 is held stationary, or a compressive force may be applied against both the metallic pin mat 110 and the pressure backer 140.

As shown in FIGS. 1 and 3, the metallic pin mat 110 can be resistively heated by the electrical energy source 150 coupled to the metallic pin mat 110. By resistively heating the metallic pin mat 110, the uncured composite sheet is heated to facilitate perforation of the uncured composite sheet 130. If heating is sufficient, the uncured composite sheet 130 is partially cured.

With reference to FIG. 2, the compressive force is preferably applied between the metallic pin mat 110 and the pressure backer 140 until the plurality of pins 112 perforate through an entire thickness of the uncured composite sheet 130. In an aspect, the compressive force is applied between the metallic pin mat 110 and the pressure backer 140 until the plurality of pins 112 perforate through an entire thickness of the uncured composite sheet 130 and the plurality of pins 112 perforate into the pressure backer 140.

In yet another aspect, the pressure backer 140 prevents a puncturing of a vacuum bag. In this regard, a vacuum bag (not shown) may be employed to encase the metallic pin mat 110, the uncured composite sheet 130, and pressure backer 140, such as during an autoclave process. By the plurality of pins 112 penetrating into the pressure backer 140, preventing of puncturing of the vacuum bags by the plurality of pins 112 can be prevented.

In an alternative aspect, the pressure backer 140 may be omitted and the pressure applicator 160, such as a roller, may directly press the uncured composite sheet 130 against the metallic pin mat 110.

Heating the portions of the uncured composite sheet 130 surrounding each pin 112 may have the function of reducing a viscosity of a resin of the uncured composite sheet 130 to promote resin penetration and separation of the fibers of the uncured composite sheet 130. In this case, the plurality of pins 112 are heated prior to the perforation of the uncured composite sheet 130, during the perforation of the uncured composite sheet 130, or both prior to and during the perforation of the uncured composite sheet 130 to reduce the resin viscosity to promote resin penetration and fiber separation sufficient that the plurality of pins 112 progress through the uncured composite sheet 130 until the constant diameter portion 115 is perforated through the through the uncured composite sheet 130. By facilitating the separation of the fibers around the perforations rather than breaking of fibers, the strength of the perforated regions may be maintained.

Heating the portions of the uncured composite sheet 130 surrounding each pin 112 may also have the function of partially curing perimeter portions 132A of the uncured composite sheet 130 surrounding each pin 112. In this case, the plurality of pins 112 are heated during the perforation of the uncured composite sheet 130, after the perforation of the uncured composite sheet 130, or both during and after the perforation of the uncured composite sheet 130 to partially cure perimeter portions 132A of the uncured composite sheet 130 surrounding each pin 112. In an aspect, the perimeter portions 132A are sufficiently cured to maintain the shape of the holes after separation from the metallic pin mat 110.

As shown, remaining portions 132B of the uncured composite sheet 130 between the perimeter portions 132A of the uncured composite sheet 130 may also be partially cured to fix an overall shape of the partially-cured composite sheet 130b. In an aspect, the uncured composite sheet 130 may be partially cured to fix an overall shape of the partially-cured composite sheet 130b.

FIG. 3 is a perspective schematic view of another exemplary system 200 for practicing a method for forming holes within an uncured composite sheet 130, in which the system 200 distinguishes from system 100 by including a thermal isolator 120. FIG. 4 is a sectional schematic view of the system 200 of FIG. 3 after perforation of the uncured composite sheet 130.

As shown in FIGS. 3 and 4, the system 200 includes metallic pin mat 110 including a plurality of pins 112, a thermal isolator 120, an uncured composite sheet 130, a pressure backer 140, an electrical energy source 150 coupled to the metallic pin mat, and a pressure applicator 160.

Prior to perforation, the composite sheet is an uncured composite sheet 130. The uncured composite sheet 130 is then perforated with the plurality of pins 112 of the metallic pin mat 110, and the plurality of pins are heated to heat portions of the uncured composite sheet surrounding each pin. The plurality of pins 112 may be resistively heated by the electrical energy source 150, or the entire metallic pin mat 110 may be resistively heated by the electrical energy source 150. The plurality of pins 112 or both the plurality of pins 112 and the metallic pin mat 110 may be formed from a high resistance metallic material to enable the resistive heating.

In an aspect, the perforating the uncured composite sheet 130 is performed by positioning the uncured composite sheet 130 between the metallic pin mat 110 and the pressure backer 140 and applying a compressive force between the metallic pin mat 110 and the pressure backer 140 to perforate the uncured composite sheet 130 with the plurality of pins 112 of the metallic pin mat 110. As shown, the compressive force is applied with a pressure applicator 160, such as the roller shown in FIG. 3, against pressure backer 140 while the metallic pin mat 110 is held stationary. However, the compressive force may be applied with any type of pressure applicator 160, and the compressive force may be applied against the metallic pin mat 110 while the pressure backer 140 is held stationary, or a compressive force may be applied against both the metallic pin mat 110 and the pressure backer 140.

With reference to FIG. 4, the compressive force is preferably applied between the metallic pin mat 110 and the pressure backer 140 until the plurality of pins 112 perforate through an entire thickness of the uncured composite sheet 130. In an aspect, the compressive force is applied between the metallic pin mat 110 and the pressure backer 140 until the plurality of pins 112 perforate through an entire thickness of the uncured composite sheet 130 and the plurality of pins 112 perforate into the pressure backer 140.

Heating the portions of the uncured composite sheet 130 surrounding each pin 112 may have the function of reducing a viscosity of a resin of the uncured composite sheet 130 to promote resin penetration and separation of the fibers of the uncured composite sheet 130. In this case, the plurality of pins 112 are heated prior to the perforation of the uncured composite sheet 130, during the perforation of the uncured composite sheet 130, or both prior to and during the perforation of the uncured composite sheet 130 to reduce the resin viscosity to promote resin penetration and fiber separation sufficient that the plurality of pins 112 progress through the uncured composite sheet 130 until the constant diameter portion 115 is perforated through the through the uncured composite sheet 130. By facilitating the separation of the fibers around the perforations rather than breaking of fibers, the strength of the perforated regions may be maintained.

Heating the portions of the uncured composite sheet 130 surrounding each pin 112 may also have the function of partially curing perimeter portions 132A of the uncured composite sheet 130 surrounding each pin 112. In this case, the plurality of pins 112 are heated during the perforation of the uncured composite sheet 130, after the perforation of the uncured composite sheet 130, or both during and after the perforation of the uncured composite sheet 130 to partially cure perimeter portions 132A of the uncured composite sheet 130 surrounding each pin 112. In an aspect, the perimeter portions 132A are sufficiently cured to maintain the shape of the holes after separation of the uncured composite sheet 130 and the metallic pin mat 110.

As shown a thermal isolator 120 is provided on the base of metallic pin mat 110. The thermal isolator 120 prevents or reduces a curing of the remaining portions 132B of the uncured composite sheet 130 between the perimeter portions 132A of the uncured composite sheet 130. Thus, the remaining portions 132B between the perimeter portions 132A remain uncured or sufficiently uncured to maintain overall flexibility of the uncured composite sheet 130 after separation of the uncured composite sheet 130 and the metallic pin mat 110. By maintaining overall flexibility of the uncured composite sheet 130, the uncured composite sheet may be formed to a desired shape during subsequent processing, such as during bonding the uncured composite sheet with a core material.

FIG. 5 is a perspective schematic view of yet another exemplary system 300 for practicing a method for forming holes within an uncured composite sheet 130, in which the system 300 includes a contoured metallic pin mat 110. FIG. 6 is a sectional schematic view of the system 300 of FIG. 5 after perforation of the uncured composite sheet 130.

Like FIGS. 1 and 2, the system 300 includes metallic pin mat 110 including a plurality of pins 112, an uncured composite sheet 130, a pressure backer 140, an electrical energy source 150 coupled to the metallic pin mat 110, and a pressure applicator 160, the difference between system 100 and system 300 being that the metallic pin mat 110 is contoured.

In this case, heating the portions of the uncured composite sheet 130 surrounding each pin 112 has the function of partially curing perimeter portions 132A of the uncured composite sheet 130 surrounding each pin 112 to maintain the shape of the holes after separation of the uncured composite sheet 130 and the metallic pin mat 110. Additionally, remaining portions 132B of the uncured composite sheet 130 between the perimeter portions 132A of the uncured composite sheet 130 may also be partially cured to fix an overall shape of the uncured composite sheet 130 to correspond to the contoured shape of the metallic pin mat 110.

FIG. 7 is a perspective schematic view of yet another exemplary system 400 for practicing a method for forming holes within an uncured composite sheet 130, in which the system 400 includes a thermal isolator 120 and contoured metallic pin mat 110. FIG. 8 is a sectional schematic view of the system 400 of FIG. 7 after perforation of the uncured composite sheet 130.

As shown in FIGS. 7 and 8, the system 400 includes metallic pin mat 110 including a plurality of pins 112, a thermal isolator 120, an uncured composite sheet 130, a pressure backer 140, an electrical energy source 150 coupled to the metallic pin mat 110, and a pressure applicator 160, the difference between system 200 and system 400 being that the metallic pin mat 110 is contoured, and the difference between system 300 and system 400 being the addition of thermal isolator 120.

In this case, heating the portions of the uncured composite sheet 130 surrounding each pin 112 has the function of partially curing perimeter portions 132A of the uncured composite sheet 130 surrounding each pin 112 to maintain the shape of the holes after separation of the uncured composite sheet 130 and the metallic pin mat 110.

Additionally, a thermal isolator 120 is provided on the base of metallic pin mat 110. The thermal isolator 120 prevents or reduces a curing of the remaining portions 132B of the uncured composite sheet 130 between the perimeter portions 132A of the uncured composite sheet 130. Thus, the remaining portions 132B between the perimeter portions 132A remain uncured or sufficiently uncured to maintain overall flexibility of the uncured composite sheet 130 after separation of the uncured composite sheet 130 and the metallic pin mat 110. By maintaining overall flexibility of the uncured composite sheet 130, the uncured composite sheet may be formed to a desired shape during subsequent processing, such as during bonding the uncured composite sheet with a core material. Meanwhile, by forming the holes using the contoured metallic pin mat 110, the shaped of the holes may be maintained when re-bent to a desired contoured shaped during subsequent processes.

Figure 10:
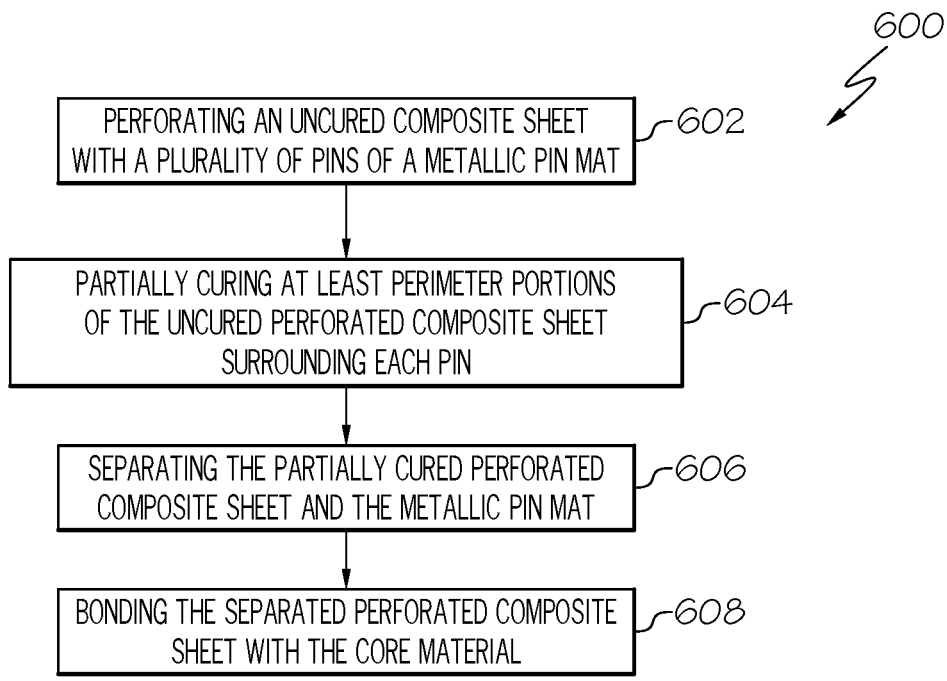
FIG. 10 is a flow diagram illustrating an exemplary method for forming a composite structure comprising a core material and a perforated composite sheet.
Figure 11:
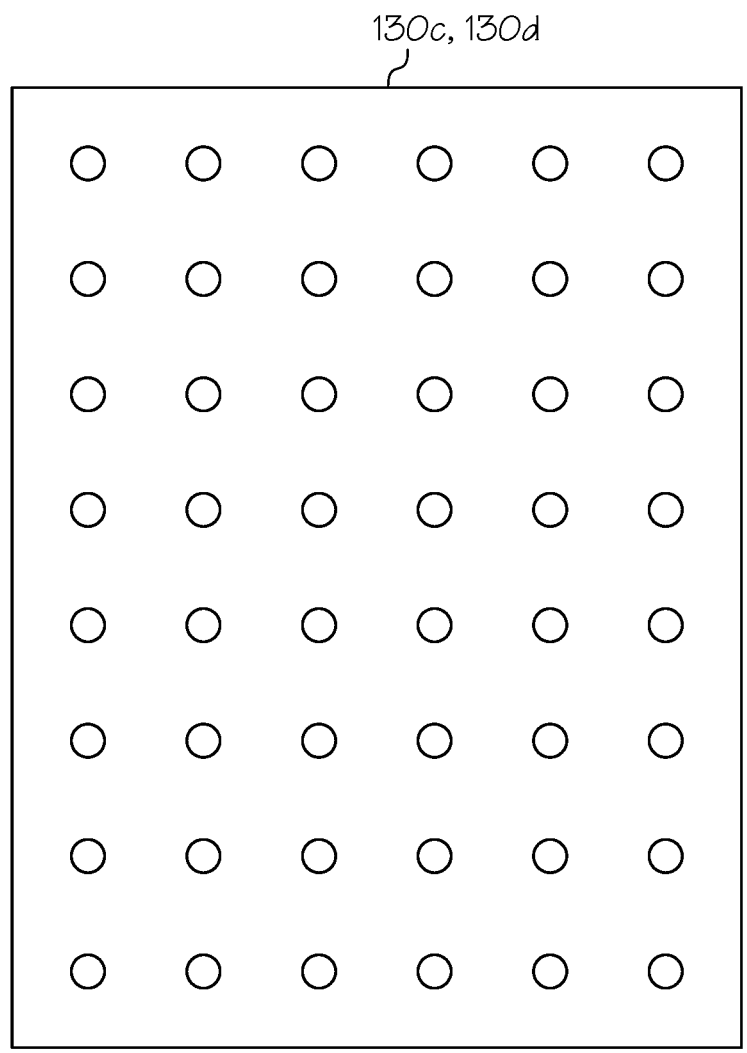
FIG. 11 is a plan view of a separated, perforated composite sheet that has been cured.

FIG. 10 is a flow diagram illustrating an exemplary method 600 for forming an uncured composite structure comprising a core material and a perforated uncured composite sheet 130*a*.

The method 600 includes, at block 602, perforating an uncured composite sheet 130 with a plurality of pins 112 of a metallic pin mat 110, at block 604, partially curing at least perimeter portions 132A of the perforated uncured composite sheet 130*a* surrounding each pin, at block 606, separating the partially-cured composite sheet 130*b* and the metallic pin mat 110, and, at block 608, bonding the separated, perforated composite sheet 130*d* with the core material.

In an aspect, the step of perforating 602 an uncured composite sheet 130 with a plurality of pins 112 of a metallic pin mat 110 includes positioning the uncured composite sheet 130 between the metallic pin mat 110 and a pressure backer 140. The metallic pin mat 110 may be flat or contoured.

In an aspect, the step of perforating 602 an uncured composite sheet with a plurality of pins of a metallic pin mat includes pressing the uncured composite sheet 130 between the metallic pin mat 110 and the pressure backer 140.

In an aspect, the step of partially curing 604 the perimeter portions 132A of the perforated uncured composite sheet 130*a* surrounding each pin includes heating the plurality of pins 112 to heat portions of the uncured composite sheet 130 surrounding each pin and applying pressure to perforate the uncured composite sheet 130. The heating functions to reduce a resin viscosity of the uncured composite sheet 130 to promote separation of the fibers of the uncured composite sheet 130 during perforation and/or functions to partially cure the perimeter portions 132A of the uncured composite sheet 130.

In an aspect, the step of partially curing 604 the perimeter portions 132A of the perforated uncured composite sheet 130*a* surrounding each pin includes heating the perimeter portions 132A of the uncured composite sheet 130 while remaining portions 132B between the perimeter portions 132*a* remain unheated or insufficiently heated so the remaining portions 132B remain uncured or insufficiently cured to maintain overall flexibility of the uncured composite sheet 130. The differential curing may be enabled by heating the plurality of pins 112 while a base portion of the metallic pin mat 110 remains unheated or insufficiently heated, or the differently heating may be enabled by heating both the plurality of pins 112 and the base portion of the metallic pin mat 110 and providing a thermal isolator over the base portion of the metallic pin mat 110.

Alternatively, heating the perimeter portions 132A of the uncured composite sheet 130 and remaining portions 132B between the perimeter portions 132*a* to partially cure the perimeter portions 132A and the remaining portions 132B between the perimeter portions 132*a* to fix an overall shape of the partially-cured composite sheet 130*b*. For example, the entire uncured composite sheet 130 may be partially cured to fix an overall shape of the partially-cured composite sheet 130b. This may be enabled by heating both the plurality of pins 112 and the base portion of the metallic pin mat 110 to heat the perimeter portions 132A of the uncured composite sheet 130 and remaining portions 132B between the perimeter portions 132a or to heat the entire uncured composite sheet 130. Alternatively or additionally, heat from an external source may be applied to heat the entire uncured composite sheet 130 to partially cure the entire uncured composite sheet 130 to fix an overall shape of the uncured composite sheet 130.

In an aspect, separation of the partially-cured composite sheet 130b and the metallic pin mat 110 is facilitated due to the thermal expansion of the plurality of pins 112 when heated. When the plurality of pins 112 are heated, they expand due to thermal expansion. When the plurality of pins 112 cool, they reduce back to their original size, but since the holes were partially cured while heated, there is be a small gap between the plurality of pins 112 and the partially cured holes, thereby facilitating separation of the partially-cured composite sheet 130b and the metallic pin mat 110.

In an aspect, the bonding of the separated, perforated composite sheet 130d and the core material includes co-curing the separated, perforated composite sheet 130d and the core material to stabilize the core to the perforated sheet. In an aspect, the separated, perforated composite sheet 130d may have overall flexibility maintained as previously described to facilitate laying up of the separated, perforated composite sheet 130d against the core material.

In an aspect, the step of bonding the separated, perforated composite sheet 130d with the core material may include bonding another composite sheet 130 (e.g., a non-perforated composite sheet) to an opposite side of the core material to form a sandwich structure. The bonding of the two composite sheets to the core may be performed together or in separate steps.

The core material is, for example, a material having an open-cell or otherwise porous construction. The material of the core may be, for example, composite, metallic, or polymer.

The co-curing of one or both of the composite sheets to the core material may include application of an autoclave cycle and may include vacuum bagging the structures to be co-cured. Alternatively or additionally, a pressure between the composite sheets and core material may be applied by mechanical pressure.

In an aspect, the method may further include additional steps, such as machining operations prior to, between, and/or after bonding of the composite sheets to the core material.

In an aspect, the method may further include reusing the same metallic pin mat 110 while repeating the method to form another composite structure comprising another core material and another perforated composite sheet.

In an aspect, the method produces an acoustic panel comprising a core material and an acoustic face sheet. The perforations in the acoustic face sheet are small through-holes formed to suppress noise by channeling pressure waves associated with sound into the open cells within the core, where the energy of the waves is dissipated through friction (conversion to heat), pressure losses, and cancellation by wave reflection. A typical construction used in aircraft engine nacelle components (such as the engine inlet, thrust reverser cowls, and blocker doors) and engine duct flow surfaces includes a sandwich-type layered structure comprising a core material between a pair of thinner face sheets, one of which is perforated, in which the sandwich-type structure has a contoured shape.

The methods described above can further include manufacturing the metallic pin mat 110. The metallic pin mat 110 may be made by any suitable process. In one aspect, the metallic pin mat 110 is made by an additive manufacturing (3D printing) process. Additive manufacturing is particularly suitable for forming the plurality of pins 112 being tapered from a base portion 113 to a narrower end portion 114 and the base portion 113 includes a constant diameter portion 115, and additive manufacturing is particularly suitable for forming a contoured shape of the metallic pin mat 110 having the plurality of pins being tapered from a base portion 113 to a narrower end portion 114 and the base portion 113 includes a constant diameter portion 115.

Figure 12:
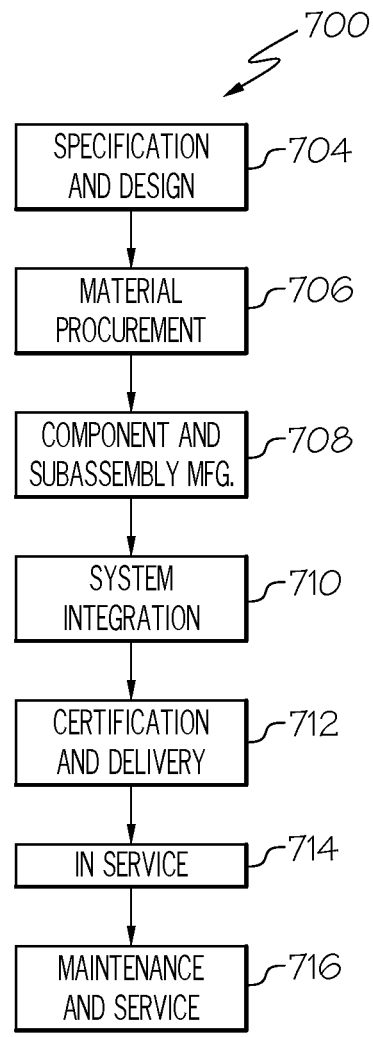
FIG. 12 is a flow diagram of an aircraft manufacturing and service methodology.
Figure 13:
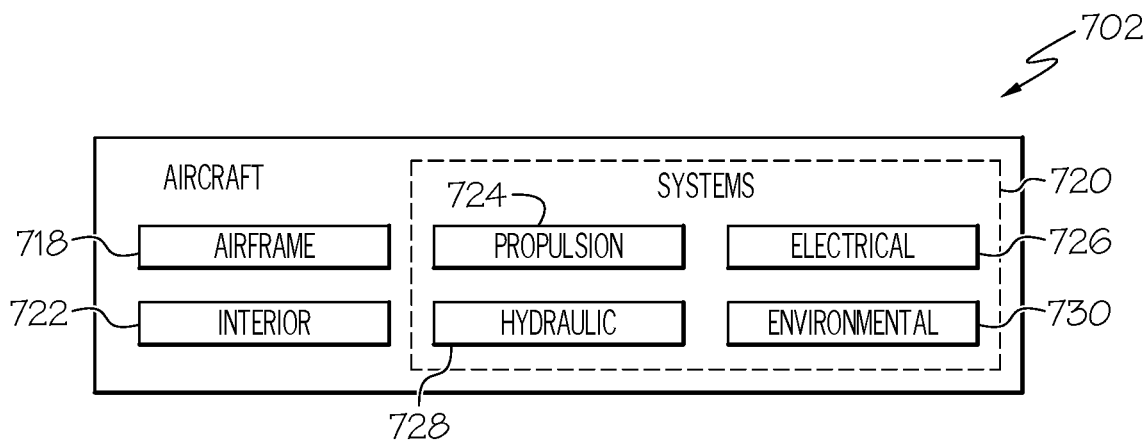
FIG. 13 is a block diagram of an aircraft.

Examples of the present disclosure may be described in the context of an aircraft manufacturing and service method 700, as shown in FIG. 12, and an aircraft 702, as shown in FIG. 13. During pre-production, the aircraft manufacturing and service method 700 may include specification and design 704 of the aircraft 702 and material procurement 706. During production, component/subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716, which may also include modification, reconfiguration, refurbishment, and the like.

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The methods and systems for forming perforated composite structures of the present disclosure may be employed during any one or more of the stages of the aircraft manufacturing and service method 700, including specification and design 704 of the aircraft 702, material procurement 706, component/subassembly manufacturing 708, system integration 710, certification and delivery 712, placing the aircraft in service 714, and routine maintenance and service 716.

As shown in FIG. 13, the aircraft 702 produced by example method 700 may include an airframe 718 with a plurality of systems 720 and an interior 722. Examples of the plurality of systems 720 may include one or more of a propulsion system 724, an electrical system 726, a hydraulic system 728, and an environmental system 730. Any number of other systems may be included. The methods and systems for forming perforated composite structures of the present disclosure may be employed for any of the systems of the aircraft 702.

Although various embodiments of the disclosed methods and systems for forming perforated composite structures have been shown and described, modifications may occur to those skilled in the art upon reading the specification. The present application includes such modifications and is limited only by the scope of the claims.

What is claimed is:

1. A method for forming holes within an uncured composite sheet, the method comprising steps of:

positioning the uncured composite sheet between a pressure backer and a resistively heatable pin mat, comprising pins;
resistively heating the pins and applying a compressive force between the resistively heatable pin mat and the pressure backer so that:
the pins of the resistively heatable pin mat displace portions of the uncured composite sheet, forming uncured-composite-sheet displaced portions, and displace portions of the pressure backer, forming pressure-backer displaced portions,
heat is conducted from the pins into the uncured-composite-sheet displaced portions and into the pressure-backer displaced portions, and
perimeter portions of the uncured composite sheet, surrounding each of the pins, are partially cured, yielding a partially cured perforated composite sheet;
separating the partially cured perforated composite sheet and the resistively heatable pin mat, thereby yielding a separated partially cured perforated composite sheet; and
curing remaining portions of the separated partially cured perforated composite sheet.

2. The method of claim 1, wherein the step of resistively heating the pins comprises resistively heating the pins by an electrical energy source.

3. The method of claim 1, wherein the step of resistively heating the pins comprises resistively heating the pins prior to the step of applying the compressive force between the resistively heatable pin mat and the pressure backer, during the step of applying the compressive force between the resistively heatable pin mat and the pressure backer, or both prior to and during the step of applying the compressive force between the resistively heatable pin mat and the pressure backer, to reduce a viscosity of a resin of the uncured composite sheet.

4. The method of claim 3, wherein the step of applying the compressive force between the resistively heatable pin mat and the pressure backer comprises a step of gradually displacing fibers in a fiber-reinforced prepreg ply of the uncured composite sheet while the pins perforate the uncured composite sheet.

5. The method of claim 4, wherein the step of applying the compressive force between the resistively heatable pin mat and the pressure backer comprises terminating the step of gradually displacing the fibers in the fiber-reinforced prepreg ply of the uncured composite sheet while the pins perforate the uncured composite sheet.

6. The method of claim 1, wherein the step of resistively heating the plurality of pins comprises curing the perimeter portions sufficiently to maintain a shape of the holes after the partially cured perforated composite sheet and the resistively heatable pin mat are separated from each other, and wherein the partially cured perforated composite sheet comprises the perimeter portions.

7. The method of claim 6, wherein the remaining portions of the separated partially cured perforated composite sheet between the perimeter portions of the partially cured perforated composite sheet remain sufficiently uncured to maintain overall flexibility of the partially cured perforated composite sheet after the partially cured perforated composite sheet and the resistively heatable pin mat are separated from each other.

8. The method of claim 7, further comprising a step of isolating heat, released by the resistively heatable pin mat, from the remaining portions of the separated partially cured perforated composite sheet that remain sufficiently uncured to maintain the overall flexibility of the partially cured perforated composite sheet.

9. The method of claim 6, wherein the step of curing the remaining portions of the separated partially cured perforated composite sheet comprises curing portions of the separated partially cured perforated composite sheet that are between the perimeter portions of the separated partially cured perforated composite sheet sufficiently to fix an overall shape of a resulting cured composite sheet.

10. A system for forming holes within an uncured composite sheet, the system comprising:
a resistively heatable pin mat, comprising pins for perforating the uncured composite sheet;
a pressure applicator for pressing the uncured composite sheet against the resistively heatable pin mat;
a pressure backer, positioned between the resistively heatable pin mat and the pressure applicator, the pressure backer configured to support a surface of the uncured composite sheet opposite to the resistively heatable pin mat, wherein the pressure backer comprises a material that is soft enough for the pins to penetrate displace portions of the pressure backer; and
an electrical energy source, coupled to the resistively heatable pin mat for resistively heating the pins.

11. The system of claim 10, wherein an overall shape of the resistively heatable pin mat is contoured.

12. The system of claim 10, wherein each of the pins is tapered from a base portion to a narrower end portion of each of the pins.

13. The system of claim 12, wherein the base portion comprises a portion, having a length and a constant diameter along the length.

14. The system of claim 10, wherein the pressure applicator comprises a pressure roller, configured to press the uncured composite sheet against the resistively heatable pin mat.

15. The system of claim 10, wherein the pressure backer is formed from at least one of rubber and dense foam.

16. The system of claim 10, further comprising a thermal isolator on the resistively heatable pin mat between adjacent ones of the pins, the thermal isolator configured to isolate heat, released by the resistively heatable pin mat, from portions of the uncured composite sheet.

17. A method for forming a composite structure comprising a core material and a perforated composite sheet, the method comprising steps of:
positioning an uncured composite sheet between a pressure backer and a resistively heatable pin mat, comprising pins;
resistively heating the pins and applying a compressive force between the resistively heatable pin mat and the pressure backer so that:
the pins of the resistively heatable pin mat displace portions of the uncured composite sheet, forming uncured-composite-sheet displaced portions, and displace portions of the pressure backer, forming pressure-backer displaced portions,
heat is conducted from the pins into the uncured composite-sheet displaced portions and into the pressure-backer displaced portions, and
perimeter portions of the uncured composite sheet, surrounding each of the pins, are partially cured, yielding a partially cured perforated composite sheet;

separating the partially cured perforated composite sheet and the resistively heatable pin mat, thereby yielding a separated partially cured perforated composite sheet; and bonding the separated partially cured perforated composite sheet with the core material.

18. The method of claim 17, wherein the step of bonding the separated partially cured perforated composite sheet with the core material comprises co-curing the separated partially cured perforated composite sheet and the core material.

19. The method of claim 6, further comprising a step of reducing a temperature of the pins before separating the partially cured perforated composite sheet and the resistively heatable pin mat from each other.

20. The method of claim 19, wherein each of the pins contracts during the step of reducing the temperature of the pins before separating the partially cured perforated composite sheet and the resistively heatable pin mat from each other.

21. The system of claim 16, wherein the thermal isolator comprises a coating on the resistively heatable pin mat, configured to contact the uncured composite sheet.

22. The system of claim 21, wherein the coating comprises a polyimide film.

23. The method of claim 8, wherein the step of isolating heat, released by the resistively heatable pin mat, from the remaining portions of the separated partially cured perforated composite sheet comprises contacting the perforated composite sheet with a thermal isolator coated on the resistively heatable pin mat.

* * * * *

UNITED STATES PATENT AND TRADEMARK OFFICE
CERTIFICATE OF CORRECTION

Page 1 of 1

PATENT NO. : 10,953,612 B2
APPLICATION NO. : 16/115798
DATED : March 23, 2021
INVENTOR(S) : Khoung et al.

It is certified that error appears in the above-identified patent and that said Letters Patent is hereby corrected as shown below:

In the Claims

In Claim 10 (Column 16, Line 24) delete the word "penetrate"

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*